United States Patent
Lüchinger

(10) Patent No.: US 8,178,799 B2
(45) Date of Patent: May 15, 2012

(54) MULTI-COMPARTMENT WEIGHING TRAY FOR A BALANCE

(75) Inventor: Paul Lüchinger, Uster (CH)

(73) Assignee: Mettler-Toledo AG, Greifensee (CH)

( * ) Notice: Subject to any disclaimer, the term of this patent is extended or adjusted under 35 U.S.C. 154(b) by 299 days.

(21) Appl. No.: 12/629,592

(22) Filed: Dec. 2, 2009

(65) Prior Publication Data

US 2010/0170723 A1 Jul. 8, 2010

(30) Foreign Application Priority Data

Jan. 8, 2009 (EP) ..................................... 09150238

(51) Int. Cl.
G01G 21/00 (2006.01)
G01G 21/28 (2006.01)
G01N 5/00 (2006.01)

(52) U.S. Cl. ........ 177/145; 177/180; 177/238; 177/262; 422/63; 422/64

(58) Field of Classification Search .................. 177/145, 177/180, 181, 238, 262; 422/63, 64, 65
See application file for complete search history.

(56) References Cited

U.S. PATENT DOCUMENTS

| | | | | |
|---|---|---|---|---|
| 4,248,315 A * | 2/1981 | Falinower | .................. | 177/50 |
| 4,287,155 A | 9/1981 | Tersteeg et al. | | |
| 5,115,876 A * | 5/1992 | Chang et al. | .................. | 177/145 |
| 5,193,630 A * | 3/1993 | Cane | .................. | 177/145 |
| 6,150,618 A * | 11/2000 | Chou | .................. | 177/145 |
| 6,557,391 B2 | 5/2003 | Luchinger | | |
| 6,784,380 B2 * | 8/2004 | Weber et al. | .................. | 177/145 |
| 6,864,438 B2 * | 3/2005 | Weber | .................. | 177/145 |
| 7,227,087 B2 | 6/2007 | Luechinger | | |
| 7,227,088 B2 | 6/2007 | Luechinger et al. | | |
| 7,767,146 B2 * | 8/2010 | Kirschenbuhler | .................. | 422/63 |
| 7,996,107 B2 * | 8/2011 | Gueller et al. | .................. | 700/240 |
| 2003/0175156 A1 * | 9/2003 | Ford | .................. | 422/63 |
| 2006/0137915 A1 | 6/2006 | Luechinger | | |

FOREIGN PATENT DOCUMENTS

JP 9-264894 A 10/1997

* cited by examiner

*Primary Examiner* — Randy W Gibson
(74) *Attorney, Agent, or Firm* — Standley Law Group LLP

(57) ABSTRACT

A carrier for objects to be sequentially weighed is designed for connection to a load receiver of a weighing cell. The carrier has a supporting structure and a multi-compartment weighing tray. The supporting structure has an element for coupling the supporting structure to the load receiver and an element for connecting the weighing tray to the supporting structure in a guided and constrained manner. The weighing tray is seated or slid into place, leaving it free to perform a defined linear, swiveling, or rotary movement relative to the supporting structure. The weighing tray has at least two receiving compartments, arranged so that each can be sequentially moved into a defined loading position, fixed relative to the supporting structure. A positioning device, arranged between the supporting structure and the weighing tray, precisely aligns with the loading position the receiving compartment that is next to be moved into the loading position.

17 Claims, 4 Drawing Sheets

MULTI-COMPARTMENT WEIGHING TRAY FOR A BALANCE

CROSS-REFERENCE TO RELATED APPLICATIONS

This application claims a right of priority under 35 USC §119 from European patent application 09 15 0238.5, filed 8 Jan. 2009, the content of which is incorporated by reference as if fully recited herein.

TECHNICAL FIELD

The disclosed embodiments concern a weighing object carrier for a balance or weighing cell, wherein the weighing object carrier is designed so that it can be connected in a simple manner to the load receiver of the weighing cell, and wherein, in comparison to known state-of-the-art solutions, the weighing object carrier has the particular advantage that serial weighing-in processes of multiple samples or gravimetric dosage-dispensing processes can be carried out more efficiently and without involving major technical measures.

BACKGROUND OF THE ART

A state-of-the-art arrangement for dispensing predetermined dosage quantities of substances can include for example an electronic laboratory balance, a dosage-dispensing instrument with a reservoir container and a metering head, as well as an electronic control instrument, for example a microcomputer. The dosage-dispensing instrument is arranged so that the outlet opening of the metering head is located above the weighing pan. The reservoir container is filled with the dosage material, and a weighing container is placed on the weighing pan in centered vertical alignment below the outlet opening of the metering head. The balance, the control instrument and the dosage-dispensing instrument constitute a closed-loop control system in which the control instrument continuously receives the actual weight of the substance that is currently present in the weighing container, compares the weight signal to a preset target weight and, based on the difference between the actual weight and the target weight, issues a control signal to the metering head. This control system allows the outflow of substance from the dosage-dispensing instrument into the weighing container to be controlled, for example in such a way that the flow of substance is slowed down as the actual weight approaches the target weight and is stopped when the target weight is attained, wherein the amount of substance that is in free fall at any time of the process can be taken into account through a lead time allowance.

In serial weighing-in processes of multiple samples or in gravimetric dosage-dispensing processes with the state-of-the-art arrangement of the foregoing description, the weighing containers are set individually on the weighing pan, aligned with the outlet opening of the dosage-dispensing device, and removed from the weighing pan after the dispensing process has been completed. If this process is performed by hand, it is not only very labor-intensive but also involves the risk that substance is spilled or that weighing containers get mixed up. Alternatively, the transfer of the weighing containers to and from the weighing pan can also be automated, for example with a so-called auto-sampler or a laboratory robot. However, the expense for such arrangements can only be justified for very high-volume dosage-dispensing applications.

It is therefore an objective to provide a suitable accessory device for a balance which allows serial weighing-in processes of multiple samples or gravimetric dosage-dispensing processes to be carried out more efficiently and without involving major technical measures, so that the weighing containers can be brought one after another precisely into a defined position, for example below the outlet opening of a dosage-dispensing device, in a quick and easy way and in particular with only a small amount of manual handling.

SUMMARY

The objective is met by a weighing object carrier according to claim 1. Detail aspects and further developed embodiments are defined in the subordinate claims which are dependent on the first claim.

A weighing object carrier which is connectable to a load receiver of a weighing cell includes a supporting structure and a multi-compartment weighing tray. The supporting structure includes on the one hand a coupling element through which the supporting structure can be coupled to the load receiver of the balance or weighing cell and on the other hand a guiding and constraining element through which the multi-compartment weighing tray can be movably connected to the supporting structure. The guiding and constraining element can for example be a linear guide, a swivel guide or a rotary guide. The connection to the supporting structure is accomplished by simply seating or sliding the multi-compartment weighing tray into the guiding element which allows a defined linear-, swivel-, or rotary movement of the multi-compartment weighing tray relative to the supporting structure. A weighing object carrier with a similarly configured supporting structure and a multi-compartment weighing tray is disclosed for example in the inventor's commonly-owned U.S. Pat. No. 6,557,391 B2, whose content is incorporated by reference.

The multi-compartment weighing tray comprises at least two receiving compartments which are arranged in such a way that with the aforementioned linear-, swivel- or rotary movement of the multi-compartment weighing tray, each of the receiving compartments can be brought sequentially into a defined, fixed loading position. Accordingly, the receiving compartments are always arranged on a straight line, a circle, or a section of a circle. The arrangement further includes a positioning device which performs its function between the supporting structure and the multi-compartment weighing tray and serves to precisely position the receiving compartment that is to be moved into the loading position. The positioning device is a feature that functions in a purely mechanical way, so that the requirement for a limited technical scope of the arrangement can be met.

The term "loading position" means a defined, fixed location within the space surrounding the weighing object carrier. This implies that once a weighing object carrier has been lined up with a loading position, each of the receiving compartments can be moved into this fixed location by means of a simple linear, swivel- or rotary movement of the multi-compartment weighing tray without any recurring adjustment steps.

As the supporting structure is only coupled to the load receiver rather than being non-releasably connected, the supporting structure can be taken off and cleaned in a problem-free way, without the need to perform extensive maintenance work on the balance. Besides the easier cleaning of the supporting structure, the weighing chamber of the balance can also be cleaned better after removing the supporting structure. In addition, the risk of damaging the weighing cell as a result of the cleaning can be minimized, because after the supporting structure has been removed, there is no longer a load receiver protruding into the weighing chamber.

It is useful if the supporting structure has at least one pivoting joint that can be locked in position and/or at least one telescopic connecting member. A supporting structure with a similarly configured pivoting joint and a telescopic connecting member is disclosed for example in the inventor's commonly-owned U.S. Pat. No. 7,227,087, whose content is incorporated by reference. With the pivoting joint and/or the telescopic connecting member, the supporting structure can be oriented and locked into position within the weighing chamber in such a way that after inserting the multi-compartment weighing tray, the receiving compartment that is currently located in the loading position is centered for example vertically below the outlet opening of a dosage-dispensing device. In a subsequent series of dosage-dispensing cycles, the supporting structure remains unchanged in its position on the balance and only the multi-compartment weighing tray is taken out of the balance.

In an advantageous embodiment of the weighing object carrier, the positioning device is arranged with linear mobility relative to the supporting structure. A spring element is arranged between the supporting structure and the positioning device in such a way that as a result of the spring force of the spring element, the positioning device is pushed against an outside contour of the receiving compartment that is currently located in the loading position.

The positioning device preferably has two positioning rollers, so that the next following receiving compartment can be brought into the loading position without requiring much effort due to friction and the receiving compartment currently in the loading position is seated with its outside contour between the two positioning rollers. The positioning device in this arrangement has the function that the receiving compartment which as a result of the aforementioned linear, swiveling, or rotary movement of the multi-compartment weighing tray has been brought closest to the loading position is pushed the rest of the way into the loading position and kept there by the spring-loaded positioning rollers. The multi-compartment weighing tray with the positioning device thus has the capability to stop its swiveling or rotary movement and to stay put at specific, exactly defined positions.

As mentioned previously, the multi-compartment weighing tray can simply be set onto the supporting structure or slid into the latter. Particularly with an arrangement of the weighing object carrier where the multi-compartment weighing tray is set from above onto the supporting structure, it is useful if the positioning rollers comprising beveled edges at the upward-facing end, i.e. that the rollers are partially tapered. When the multi-compartment weighing tray is set into the supporting structure, the positioning rollers as a result of the tapered edges will be able to glide along a contour of the multi-compartment weighing tray and to recede slightly, which makes it significantly easier to set the multi-compartment weighing tray in place.

It is of practical advantage if the multi-compartment weighing tray of a weighing object carrier is equipped with an alignment aid and/or a position indicator. This feature ensures or at least helps to correctly orient the multi-compartment weighing tray in a starting position for a series of weighings and also to correctly terminate the series after a prescribed number of weighings has been completed. An alignment aid can be configured for example as a convex-pointed projection on the multi-compartment weighing tray. It is further possible to realize a position indicator by setting a lid on one of the receiving compartments, for example as a variable marker of an ending position.

The multi-compartment weighing tray of a weighing object carrier is advantageously equipped with means of identification. They can on the one hand serve to distinguish the multi-compartment weighing tray from other multi-compartment weighing trays, and on the other hand to identify individual receiving compartments within a multi-compartment weighing tray through a numbering system. These means of identification can be simple alphanumeric labels which can be read by an operator, or it is also conceivable to use electronically readable solutions, for example with a barcode or a matrix code or an RFID chip for the multi-compartment weighing tray and with a binary-coded circular scale for the numbering of the receiving compartments. Furthermore, on an RFID chip one could even store information about the substance to be dispensed, about substance formulations, or about the dosage-dispensing process.

In a further embodiment of the weighing object carrier, the multi-compartment weighing tray is equipped with exchangeable receiving compartments that are designed to customer specifications. The receiving compartments can for example be configured as recesses serving to directly receive the materials to be weighed, or also as suitably shaped seats for separate weighing containers.

Furthermore, in each of the embodiments of the weighing object carrier described above it is advantageous if the receiving compartments of the multi-compartment weighing tray are cup-shaped at least on the outside, in particular with a cylindrical external contour.

As an ergonomic measure, the multi-compartment weighing tray is advantageously equipped with a knurled pattern or with a plurality of finger holds (cutouts or depressions to provide a grip hold for the fingers). As a result, the multi-compartment weighing tray can be turned with a slight finger movement and without significant lateral pressure on the multi-compartment weighing tray in order to bring the receiving compartments one after another into the loading position. Of course, instead of a finger-driven operation, there could also be a suitable actuating implement, for example a rod with a hook, so that the multi-compartment weighing tray does not have to be moved through direct finger contact.

The weighing object carrier in one of the embodiments described above is intended to be used in a laboratory instrument, particularly in a balance, in a dosage-dispensing device containing a weighing cell, in a balance that is automated with a load-lifting device, or in a device containing a weighing cell which is used to prepare formulations of substances.

The aforementioned load-lifting device allows the entire weighing object carrier to be uncoupled from as well as coupled to the load receiver, which makes it possible to check or calibrate the weighing cell. As an alternative possibility, the load-lifting device could also be used only for the multi-compartment weighing tray to be lifted up from or to be set down on the supporting structure, if this appears to be more practical.

It is in particular envisioned that the laboratory instrument has an enclosed draft shield, wherein at least one of the lateral sliding doors of the draft shield has an operator access opening with a sliding shutter. The draft shield encloses a weighing chamber in whose interior the weighing object carrier is arranged. The operator access opening is advantageously located in close proximity to the aforementioned knurl pattern or the finger holds of the multi-compartment weighing tray, which has the advantage that one does not need to open the entire draft shield door, but only the sliding shutter, in order to turn the multi-compartment weighing tray by a simple finger movement or by means of an actuating device. A draft shield with a similarly designed loading access opening that can be closed by means of a sliding shutter is disclosed for example in the inventor's commonly-owned U.S. Pat. No. 7,227,088 B2, the content of which is incorporated by reference.

The laboratory instrument can further have a motorized mechanism for the stepwise movement of the multi-compartment weighing tray of the weighing object carrier. This takes the place of turning the multi-compartment weighing tray through finger contact or with an operating device.

As a final note, it should be pointed out that the object that is actually being weighed is not one of the individual receiving compartments nor one of the weighing containers seated in the receiving compartments, but that the weighing object is always the weighing object carrier with all of the weighing containers and the substances dispensed into them. The substance quantity in a weighing container therefore has to be determined through a differential measurement, wherein the weight of the dispensed substance quantity is determined by subtracting from the current weighing result the amount that was measured before the start of the current dosage-dispensing cycle. So as not to unnecessarily reduce the weighing range of the weighing cell, it is desirable to aim as much as possible for a light-weight design of the weighing object carrier by leaving out material portions that are structurally unnecessary. If the dead weight represented by the weighing load carrier is always the same, it can be compensated in the weighing cell with a corresponding counterweight, as is customary for example in mass comparators.

BRIEF DESCRIPTION OF THE DRAWINGS

The weighing object carrier with its main components and essential details is explained in the following detailed description through an example of an embodiment, with references to the drawings wherein identical parts are identified with identical part numbers and wherein.

DETAILED DESCRIPTION OF THE DRAWINGS

Figure 1:
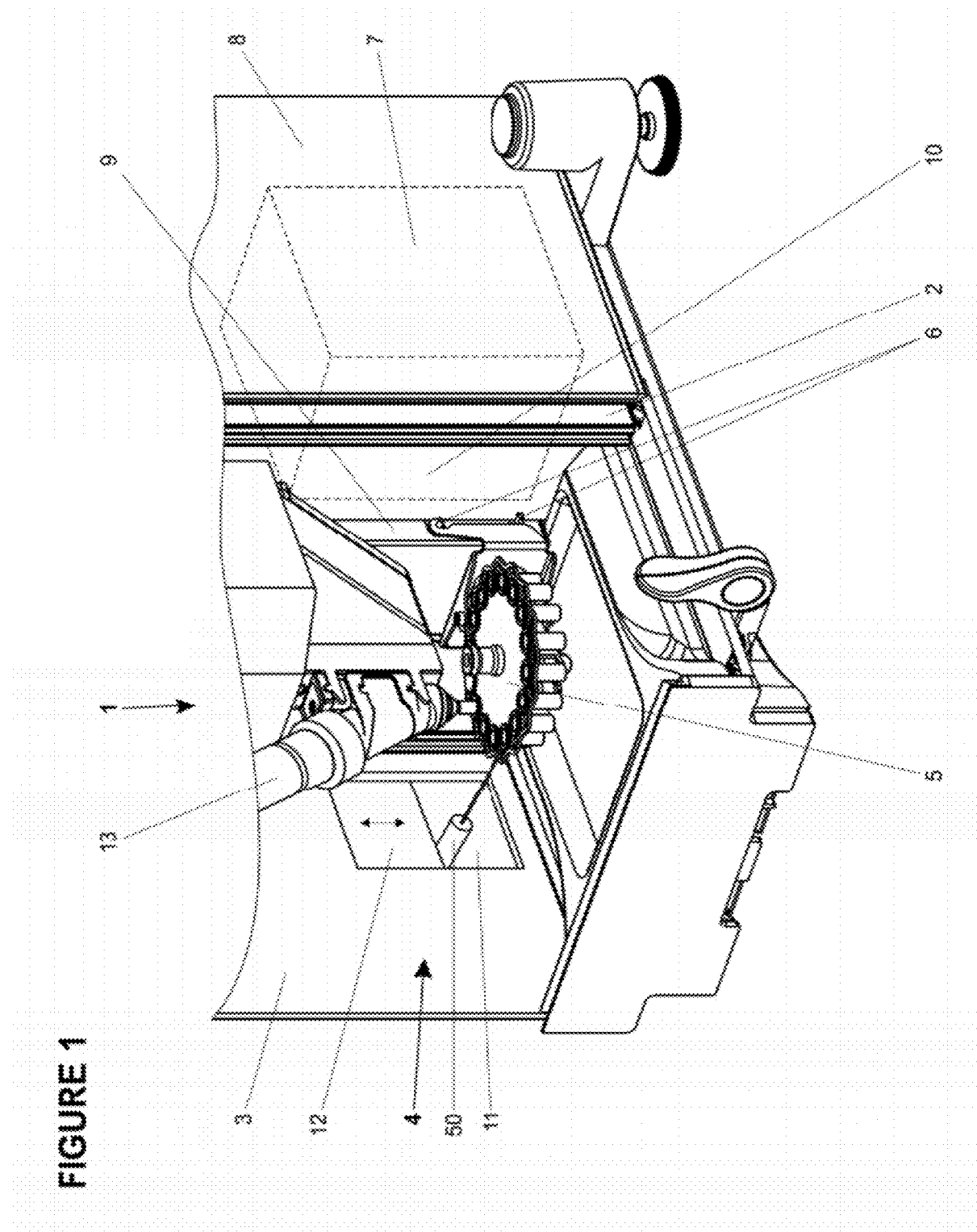
FIG. 1 is a partial perspective view of the weighing chamber of a laboratory balance, illustrating in particular the arrangement of the weighing object carrier with the multi-compartment weighing tray as well as the operator access opening with the sliding shutter.

FIG. 1 shows a part of a laboratory instrument 1, specifically of a balance, in a three-dimensional view directed at an angle from the front. The draft shield sidewall panel 2 that is closer to the viewer is opened, the front wall is left out, and the sidewall panel 3 that is farther away from the viewer is closed. Thus the view is open into the interior of the weighing chamber, so that it is possible to see the weighing object carrier 5 which is suspended on the load receiver pins 6 of the weighing cell 7 (indicated by broken lines) which is enclosed in a weighing cell compartment 8 of the balance 1 that lies farther away from the viewer. The load receiver pins 6, which are part of a load receiver (not shown in the drawing) of the weighing cell 7 indicated by broken lines, reach without contact through lateral passage openings in a forward-projecting channel 9 of the rear wall 10 of the weighing chamber 4. Also within view is the operator access opening 11 with sliding shutter 12 in the draft shield sidewall panel 3 on the side that is farther away from the viewer, which allows access for manually advancing the weighing object carrier 5 through finger contact as will be described below. Of course, instead of direct finger contact, there could also be a suitable actuating device 50, for example a rod with a hook, for reaching through the access opening 11 into the weighing chamber 4, rather than using a finger. The hook of the actuating device 50 could for example be used to engage suitable cutouts or openings of the weighing object carrier 5. Using an actuating tool 50 prevents the air in the weighing chamber 4 from being unnecessarily warmed up by body heat from the operator's finger.

Located above the weighing object carrier 5 in FIG. 1 is a dosage-dispensing device 13 which is for example suspended at the rear wall 10 and constrained by linear-movement guiding means (not shown) in such a way that is can easily be taken off the rear wall as well as moved up and down, towards and away from the weighing object carrier.

Figure 2:
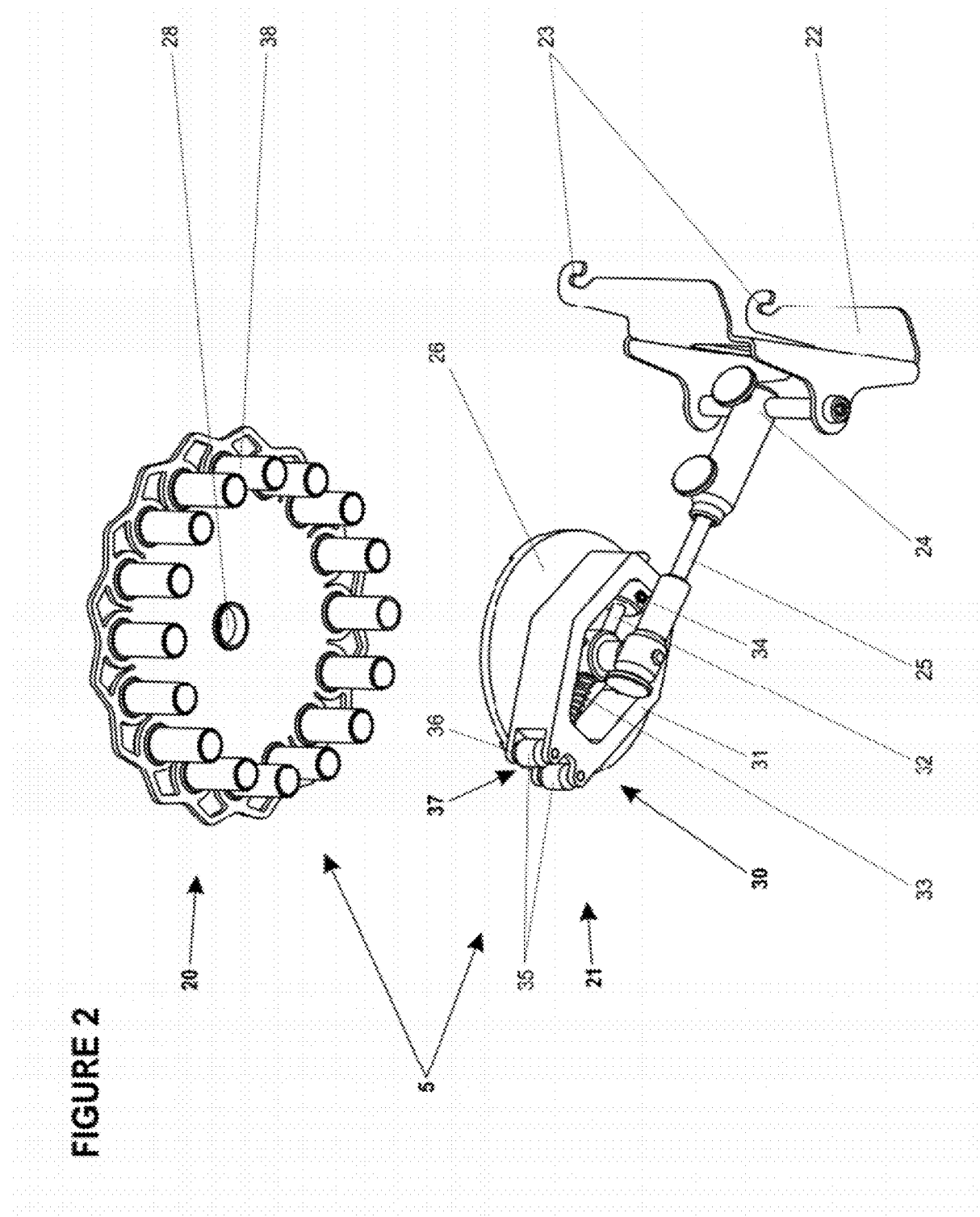
FIG. 2 is a perspective view, from below, of the FIG. 1 weighing object carrier, isolated from the supporting structure, but aligned to be set down directly thereupon.

In FIG. 2, the weighing object carrier 5 is shown in a three-dimensional view at an angle from below, wherein the multi-compartment weighing tray 20 is removed from the supporting structure 21 but is aligned to be set down directly on the supporting structure 21. As a part of the supporting structure 21 the drawing shows the coupling element 22 with the suspension hooks 23 which serve to attach the weighing object carrier to the aforementioned load receiver pins 6 of the weighing cell 7. The coupling element 22 is connected through a pivoting joint 24 that can be locked in position and a telescopic connecting member 25 to the carrier plate 26 on which the multi-compartment weighing tray 20 can be seated. The multi-compartment weighing tray 20 can turn on the carrier plate 26 like a carousel. As guide for the swiveling or turning carousel movement, the carrier plate 26 has a central upward-directed pin or peg 27 (shown with broken lines in FIG. 3) which enters into engagement with a central bore hole 28 in a hub 29 (see FIG. 3) of the multi-compartment weighing tray 20. Accordingly, the carrier plate 26 in connection with the pin 27 and the central bore hole 20 serves as a guide and seat.

Arranged below the carrier plate 26 is the positioning device 30, configured in this embodiment as an elongated hexagonal frame 31 which is movable in a straight line relative to the carrier plate 26, constrained by a guide rail 32 and pre-tensioned by a compression spring against an adjustable collar bushing 34 serving as a limit stop. The end of the frame 31 that faces away from the coupling element 22 carries two positioning rollers 35 whose function will be described below in more detail.

As mentioned above, the carousel-type multi-compartment weighing tray 20 which is shown in perspective views directed at an angle from below in FIG. 2 and from above in FIG. 3 has a hub 29 at its center which contains a bore hole 28. To facilitate the seating of the multi-compartment weighing tray 20 onto the carrier plate 26, the pin or peg 27 of the carrier plate 26 and/or the bore hole 28 of the hub 29 can be designed with a conical taper. Arranged at regular intervals along the perimeter of the multi-compartment weighing tray 20 are the receiving compartments 38, for example in the form of cylindrical cups or sleeves. Normally, the substance to be weighed is not dispensed directly into the receiving compartments 38 but rather into suitable weighing containers 39 which are set into the receiving compartments 38. At its outside border, the multi-compartment weighing tray has a knurled surface pattern 40 as well as cutout openings 41 (finger holds) which facilitate pushing the multi-compartment weighing tray 20 through finger contact to perform is stepwise rotation. The outside contour of the hub 29 can be designed with an ergonomically favorable shape, so that the operator can grasp the multi-compartment weighing tray 20 firmly and securely in his hand when setting the multi-compartment weighing tray down on, or lifting it up from, the carrier plate 26, without getting his fingers near the receiving compartments 38.

As already mentioned, when the multi-compartment weighing tray 20 is set in place on the supporting structure 21, the bore hole 28 enters into engagement with a central pivot pin or peg 27 or the carrier plate 26. Also at the same time, one of the receiving compartments 38 has to be set into the loading position 37. To allow the respective receiving compartment 38 to take its place between the positioning rollers 35 simply by pushing it slightly from above, the positioning rollers 35 have a conical bevel or taper 36 at the end that faces towards the multi-compartment weighing tray 20, so that the positioning device 30 which is pre-tensioned by means of the spring is urged in the direction of the coupling element 22 by the receiving compartment 38 when the latter is pushed into place.

Figure 3:
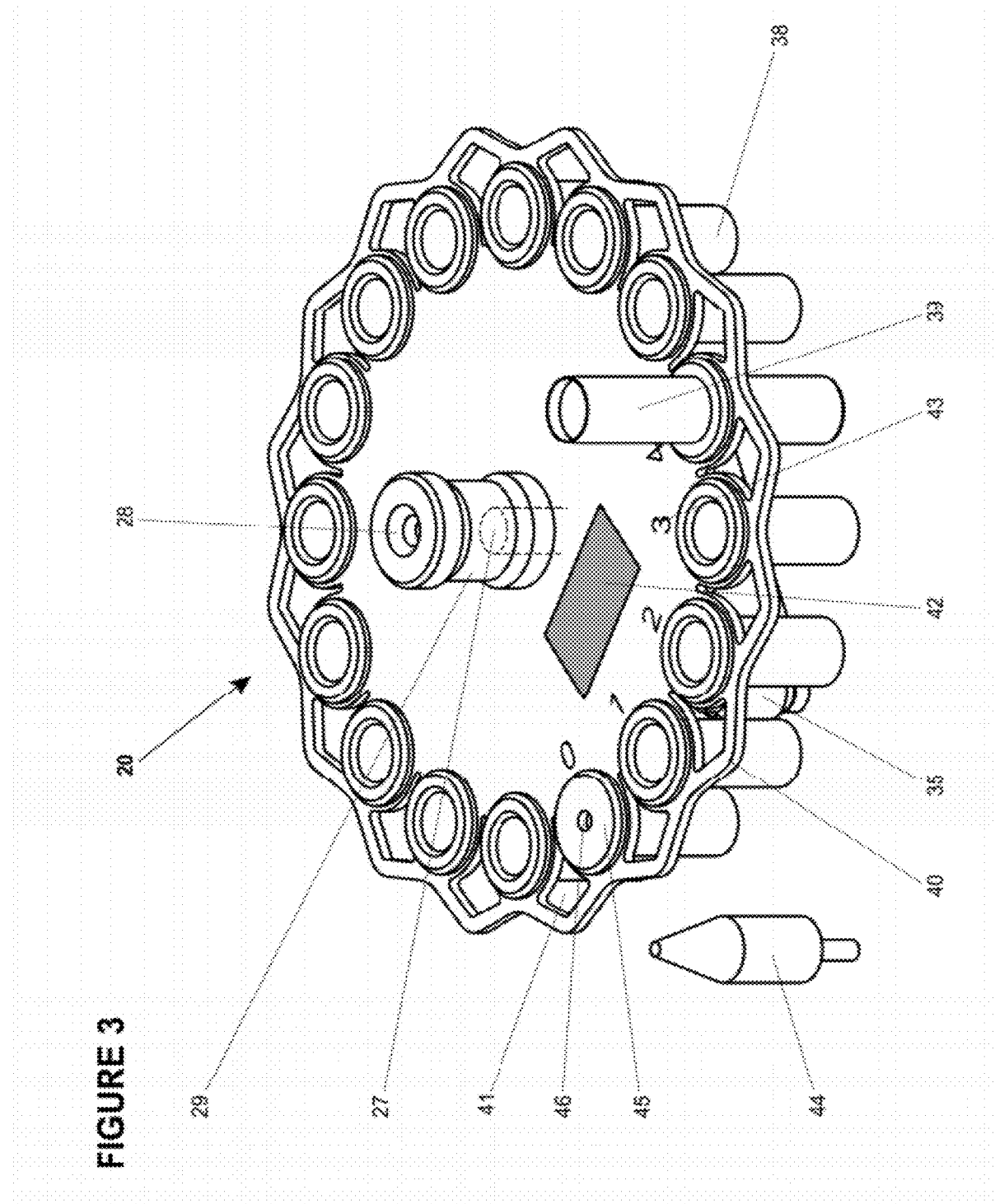
FIG. 3 is an enlarged perspective view, from above, of the multi-compartment weighing tray seated on the supporting structure.

FIG. 3 further shows an example of an identification means 42 for a multi-compartment weighing tray 20, in particular with a barcode or RFID chip, and of an identification means 43 for marking the individual receiving compartments 38 with position numbers 43. The multi-compartment weighing tray 20 shown in FIG. 3 can further be equipped with an alignment aid 44 and a position indicator 45.

The position indicator 45 ensures or at least helps to correctly position the multi-compartment weighing tray 20 in a starting position for a series of weighings as well as to correctly terminate the series after a prescribed number of weighings has been completed. If the capability to mark a variable end position is desired, a position indicator 45 can be realized by setting a lid on one or more of the receiving compartments 38.

The alignment aid 44 is used once in a weighing series to orient and set the supporting structure 21 into alignment with a given loading position, for example with an outlet opening of the dosage-dispensing device 13 shown in FIG. 1. The alignment aid 44 can be configured for example as a convex-pointed projection that is set into a bore hole 46 of the position indicator 45, or it can be formed directly on the multi-compartment weighing tray 20. Of course, the alignment aid 44 can be used simultaneously as position indicator.

Figure 4:
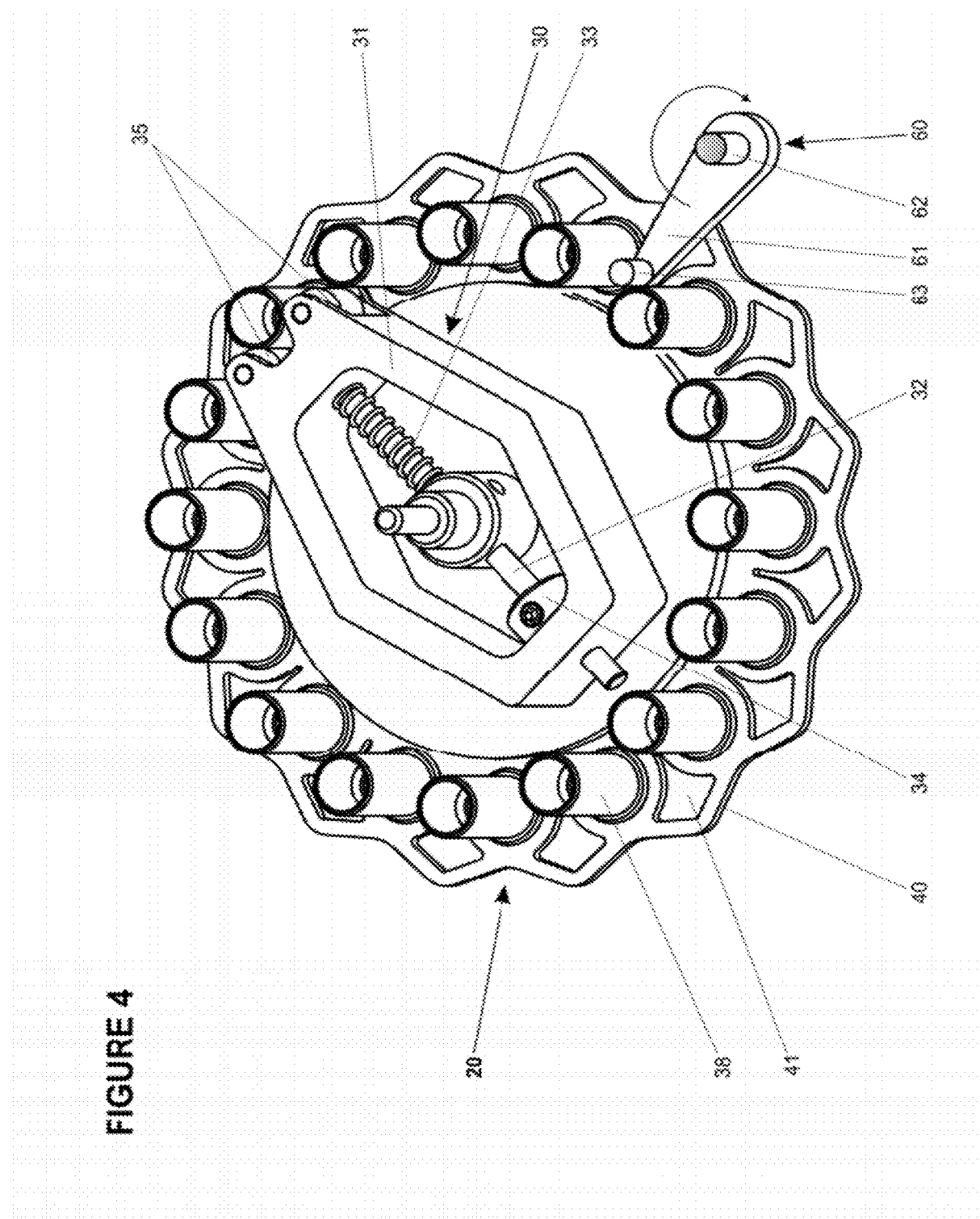
FIG. 4 is a perspective view, from below, of a positioning device with a multi-compartment weighing tray seated in place, to illustrate more clearly how the positioning device works.

To explain the function of the positioning device 30, the latter is illustrated in FIG. 4, seen at an angle from below, with the carrier plate 26 of the supporting structure 21, and with the multi-compartment weighing tray 20 set in place. Within a series of weighings or dosage preparations, a predetermined substance quantity is delivered by the dosage-dispensing device (also see FIG. 2) to the receiving compartment 38 that is currently in the loading position 37 or into a weighing container 39 that is seated in the receiving compartment 38. Then, with a push of a finger, the next-following receiving compartment 38 is brought to the loading position, whereupon the next dosage-dispensing cycle takes place. Due to the positioning device 30, no tricky manipulation is necessary in order to bring the receiving compartment 38 exactly to the loading position 37. As soon as a receiving compartment 38 is brought into the space between the two positioning rollers 35, which requires an effort to overcome the pre-tensioning force of the spring 33, the spring-biased positioning rollers 35 will push the receiving compartment 38 the rest of the way into the loading position 37 and hold it securely in place, as shown in FIG. 4. As will be explained in the following, having a positioning device 30 also makes it easier to automate the stepwise sequential advance of the receiving compartments 38 into the loading position.

A laboratory instrument (not included in FIG. 4) can further be equipped with a motorized driving mechanism 60 to actuate the movement of the holding compartment 20. Of this mechanism 60, only the driving shaft 62 and the take-along lever 61 are shown in the drawing. For the stepwise advance of the multi-compartment weighing tray 20 of the weighing object carrier 5, the driving shaft 62 rotates about its lengthwise axis, making one full turn for each step. The take-along lever 61 is positioned and oriented in such a way that a take-along bolt 63 which is arranged on the take-along lever 61 reaches between the outside contours of two adjacent receiving compartments 38. The gap between the outside contours is significantly wider than the diameter of the take-along bolt 63, leaving ample play between the take-along bolt 63 and the multi-compartment weighing tray 20. In one full turn of the take-along lever, the start and end position for the movement of the take-along bolt 63 lies between the outside contours of two adjacent receiving compartments 38 without touching the latter. As the receiving compartments 38 are pushed into the exact loading position by the positioning device 30, the multi-compartment weighing tray is after each step-advance movement completely separated from the drive mechanism 60. This separation is absolutely necessary, because any contact between the drive mechanism 60 and the multi-compartment weighing tray 20 would create a force-transmitting contact to the multi-compartment weighing tray 20, which would introduce an error into the weighing result. Of course, the driving mechanism 60 can also have several take-along bolts. 63.

It should be mentioned explicitly that besides the carousel-type arrangement of the multi-compartment weighing tray shown here it would also be conceivable to use a linear arrangement wherein the receiving compartments are arranged for example sequentially in a straight line in an elongated rectangular plate which is moved relative to the supporting structure along a straight-line guide track and wherein the receiving compartments are in analogous manner brought one after another into the loading position where they are exactly centered and held in place by the positioning device.

As long as weighings continue to be performed in serial sequences, the supporting structure of the weighing object carrier as well as the dosage-dispensing device normally remain attached to the balance and are only taken off again when the balance is set up for a different application, for example for individual manual weighings. It can nevertheless be advantageous if the process of inserting the weighing containers into the multi-compartment weighing tray takes place outside the balance, in which case the multi-compartment weighing tray is taken out of the balance after the completion of a weighing series and the filled weighing containers are replaced by empty weighing containers. The multi-compartment weighing tray can also be set down outside of the balance onto a flat plate or a suitable supporting structure, and the weighing containers can be capped with a closing lid. Of course, there can also be an automatic closure device into which a filled multi-compartment weighing tray can be set, wherein the weighing containers are automatically closed with caps by the automatic closure device.

It can further be practical to have several multi-compartment weighing trays available at a weighing station, so that for example one multi-compartment weighing tray is filled with weighing containers by one person, while another person performs a weighing series with a second multi-compartment weighing tray. It can further be useful to have multi-compartment weighing trays available which are equipped with different receiving compartments that have a customer-specific design and/or are exchangeable.

While the invention has been presented through a description of specific examples of embodiments, it is considered evident that numerous further variants can be created based on knowledge thereof, for example if features of the individual embodiments are combined with each other and/or individual functional units of the embodiments are exchanged with each other. Among other ideas, embodiments of the inventive concept could be considered in which for example the multi-compartment weighing tray itself represents a subdivided weighing container. In this case, the substance doses would be dispensed directly into the receiving compartments and the latter would be closed up for example with an adhesive or weldable film or foil.

What is claimed is:

1. A carrier for a plurality of weighing objects in association with a weighing cell, the carrier being adapted for connection to a load receiver of the weighing cell, the carrier comprising:
   a supporting structure, comprising:
      a coupling element, adapted to couple the supporting structure to the load receiver; and
      a guiding and constraining element;
   a multi-compartment weighing tray, seated in or slidingly received by the guiding and constraining element, such that the multi-compartment weighing tray moves in a guided manner relative to the supporting structure; the multi-compartment weighing tray comprising at least two receiving compartments, arranged so that each receiving compartment can be brought sequentially into a defined, fixed loading position; and
   a device for positioning, to match up with the loading position, the receiving compartment to be moved next into the loading position, the positioning device operably located between the supporting structure and the multi-compartment weighing tray.

2. The weighing object carrier of claim 1, wherein:
   the supporting structure further comprises, arranged between the coupling element and the guiding and constraining element, at least one of: at least one pivoting joint that can be locked in position and at least one telescopic connecting member.

3. The weighing object carrier of claim 2, further comprising:
   a spring element, arranged between the supporting structure and the positioning device, which is linearly mobile relative to the supporting structure, a spring force of the spring element pressing the positioning device against an outside contour of the receiving compartment that is currently located in the loading position.

4. The weighing object carrier of claim 3, further comprising:
   two positioning rollers, constituting part of the positioning device, that are pressed against the outside contour, which is disposed between the two positioning rollers.

5. The weighing object carrier of claim 4, wherein:
   each positioning roller comprises beveled edges at the ends thereof for setting the multi-compartment weighing tray into place.

6. The weighing object carrier of claim 1, wherein:
   the multi-compartment weighing tray comprises at least one of: an alignment aid and a position indicator.

7. The weighing object carrier of claim 1, further comprising:
   an identifier means, constituting part of the multi-compartment weighing tray.

8. The weighing object carrier of claim 1, further comprising:
   cup-shaped receiving compartments having a cylindrical outside contour.

9. The weighing object carrier of claim 1, further comprising:
   means for improving a manual operation of the multi-compartment weighing tray in bringing the receiving compartments sequentially into the loading position, comprising at least one of: a knurled perimeter surface and a plurality of finger holds.

10. A laboratory instrument, comprising:
    a weighing cell; and
    a weighing object carrier of claim 1.

11. The laboratory instrument of claim 10, further comprising:
    an enclosed draft shield compartment, at least one of whose sidewalls has an operator access opening with a sliding shutter.

12. The laboratory instrument of claim 10, further comprising:
    a motorized drive mechanism for advancing the multi-compartment weighing tray of the weighing object carrier in a stepwise manner.

13. The weighing object carrier of claim 1, further comprising:
    a spring element, arranged between the supporting structure and the positioning device, which is linearly mobile relative to the supporting structure, a spring force of the spring element pressing the positioning device against an outside contour of the receiving compartment that is currently located in the loading position.

14. The weighing object carrier of claim 3, wherein:
    the multi-compartment weighing tray comprises at least one of: an alignment aid and a position indicator.

15. The weighing object carrier of claim 3, further comprising:
    an identifier means, constituting part of the multi-compartment weighing tray.

16. The weighing object carrier of claim 3, further comprising:
    cup-shaped receiving compartments having a cylindrical outside contour.

17. The weighing object carrier of claim 3, further comprising:
    means for improving a manual operation of the multi-compartment weighing tray in bringing the receiving compartments sequentially into the loading position, comprising at least one of: a knurled perimeter surface and a plurality of finger holds.

* * * * *